Feb. 9, 1954 W. A. TOLSON 2,668,418
PHASING OF ENGINES, MOTORS, AND THE LIKE
Filed July 26, 1951 2 Sheets-Sheet 1
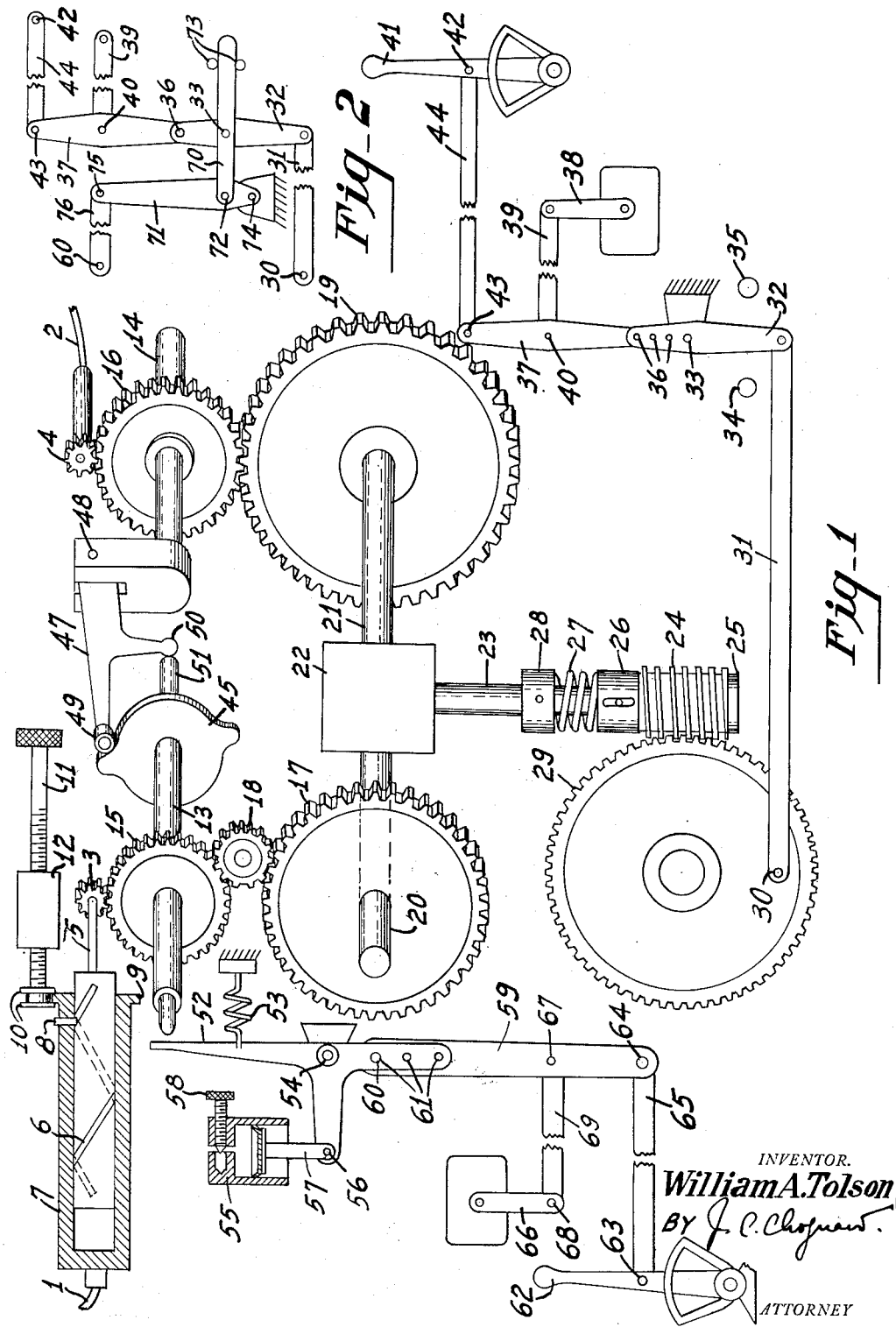
INVENTOR.
William A. Tolson
BY
ATTORNEY Feb. 9, 1954 W. A. TOLSON 2,668,418
PHASING OF ENGINES, MOTORS, AND THE LIKE
Filed July 26, 1951 2 Sheets-Sheet 2

INVENTOR.
William A. Tolson
BY J. C. Chapman
ATTORNEY

Patented Feb. 9, 1954

2,668,418

UNITED STATES PATENT OFFICE 2,668,418

PHASING OF ENGINES, MOTORS, AND THE LIKE

William A. Tolson, Hightstown, N. J.

Application July 26, 1951, Serial No. 238,750

16 Claims. (Cl. 60—97)

1

My invention relates to the maintenance of a substantially constant angular relationship between two or more rotating shafts, and more particularly to apparatus for maintaining such a relationship between the shafts of engines used for the propulsion of vehicles such as aircraft or boats. This patent application is a continuation-in-part of my patent application Serial No. 139,-310, filed January 18, 1950, now abandoned.

When two or more engines are used for the propulsion of aircraft or boats, it is well known in the art, that asynchronous operation results in an almost endless variety of vibrational effects due to the addition and/or subtraction of the vibrational effects of the various engines, which are occurring at different frequencies due to the differences in their speeds. When synchronous operation is secured, there is still the possibility and indeed the probability that at certain points in the "hunting" cycle of the various engines, the vibrational effects will be additive and will produce severe vibrational stresses in the structural members of the craft. It thus becomes evident that synchronization of the engines per se will not provide optimum operating conditions, and that the optimum angular relationships between the various engine shafts must be determined experimentally, and means must be provided for maintaining such relationships substantially constant during operation. For the purpose of this specification, the word "phasing" will be used to mean the adjusting to, and the maintenance of, any desired angular relationship between two rotating shafts; also, the word "driver" will be used to denote any source of power used for driving a shaft rotationally.

The solution to such a synchronization problem involves the use of the driving units as parts of a servo mechanism, with the additional difficulty that the controlled driving units are not well adapted for use in a servo mechanism, due to the fact that the various controlling elements (i. e. throttle setting, ignition timing, propeller pitch, etc.), do not control the speed per se, but serve to change the delivered power of the engines. In the apparatus of my invention, two controls are provided. One of the controls secures approximate synchronization, and the other acts in conjunction with the synchronizing control to provide phasing after approximate synchronization has been achieved.

It is well known in the servo mechanism art, that when two interdependent controls are employed, the time constants of the two controls must be widely different, otherwise objectionable hunting will result.

2

The problem of phasing is complicated by the requirement that a satisfactory phasing system should not interfere with the normal control of the engines by means of their respective hand throttle controls. This requirement is evidenced by the fact that it often becomes necessary to "feather" one or more engines in an aircraft, for example, or to idle or reverse one engine when maneuvering a twin-screw boat in close quarters.

The apparatus of my invention has several features which enable stable and satisfactory operation to be secured.

First: The phasing element (which requires high accuracy), applies its corrections at a relatively high rate.

Second: The phasing element applies a correction which is small compared to the total correction applied by the synchronizing element, thus effecting only the phase of the system and not the overall speed thereof.

Third: The synchronizing element is relatively slow-acting but provides a total control action much greater than that provided by the phasing unit.

Fourth: My invention provides an apparatus in which the controlled drivers are rigidly connected to the controlling mechanism, thus avoiding slippage between the controlling mechanism and the drivers, since even a minor amount of slippage will cause instability in the system. To avoid misunderstanding, it is explained that the use of the term "rigidly connected" is intended to mean a connection or coupling which permits no slippage even over long periods of time, although a fixed amount of "twist" or "give" in the connection or coupling is permissible. For instance, electrical units known to the trade as "Synchros" or similar devices would provide satisfactory coupling means, although such units would allow a phase difference to exist between the driving and driven elements.

Fifth: The operation of the phasing and synchronizing elements are cooperative. For instance—after proper phasing has been established, any of a number of extraneous causes may conspire to increase or decrease the speed of one of the drivers (with respect to the other) beyond the point where the control capabilities of the phasing element are effective to maintain constant phase. Under this condition, the driver units will slowly drift with respect to each other for a complete cycle. During this drift of one cycle, however slow, the synchronizing element will apply a correction in a direction to compensate for the drift. If after one cycle of drift, the phasing element still has an insufficient amount of control to reestablish proper phase, the drift will be continued for a second cycle, during which the synchronizing element applies a still further correction. This action is repeated until the tendency to drift is less than the correction which is supplied by the phasing element at which time correct phase is re-established. The correction applied by the synchronizing element is dependent upon the integrated difference in the number of revolutions of the two drivers (over its permitted range of operation), and not upon the instantaneous difference in speed of the drivers.

Sixth: The total correction applied by the phasing element is slightly greater than the correction applied by the synchronizing element during one complete cycle of drift of one driver with respect to the other. This operation precludes the possibility that, after the tendency to drift has exceeded the capability of correction of the phasing element, a further fraction of a cycle of drift might result in the synchronizing element introducing a correction sufficient to produce a state of unstable equilibrium. Such a condition would render the phasing element inoperative and would defeat the purpose of the system.

I believe my invention to reside basically in a unique combination of known mechanical elements for the purpose of phasing a plurality of drivers with respect to each other, such combination being made in such a manner as to produce results new and useful over and above any arrangement known to me.

An example of the prior art systems may be had by reference to U. S. Patent 2,269,332 to Bench et al. In this patent, there is provided a pair of engines having throttles that are controlled individually by the output of individual differential elements. The differentials compare the speed of each engine with the speed of an individual comparison hydraulic motor; each of the latter being driven by a hydraulic pump, which in turn is driven by a speed-controlled electric motor. The speed of this electric motor sets the speed of all of the engines since the individual differentials control the engine throttles in such fashion that each engine is brought to the speed of its comparison hydraulic motor, which in turn has been controlled by the speed of the speed controlled motor.

No phasing is attempted and thus vibrational effects may be set up in the system as pointed out herein before.

Additionally, the corrections applied to each engine are not proportional to the integrated difference in revolutions of one engine with respect to another, but are proportional to the integrated difference in revolutions of each engine with respect to an independent speed comparison motor.

Next, while hydraulic motors operated in series may be made to operate at speeds extremely close to synchronism, it is well known that small differences in internal clearances, friction, load, etc. will cause them to drift slowly with respect to each other. With the basic features of my invention set forth hereinbefore in mind, it will be clear that such a speed-comparison system could not be used in carrying out my invention, since even extremely small amounts of slip would preclude successful operation of my system.

Further, an independent speed-comparison motor could not be used in carrying out the purposes of my invention, since such an arrangement inhibits the use of normal manual throttle control when such operation is desired.

Again, the entire system as set forth in the patent to Bench et al., does not envisage phasing, which is a primary object of my invention.

Distinctions between the apparatus of my invention and that of the prior art may be better understood by a perusal of the objects of my invention.

It is a primary object of my invention to provide apparatus for phasing two or more rotating shafts, and more particularly, for phasing two or more engines used for the propulsion of vehicles such as, for instance, aircraft or boats.

It is a further object of my invention to provide such phasing by means of two cooperating controls—one of which operates to provide approximate synchronization and the other to provide phasing after approximate synchronization has been attained.

It is a still further object of my invention to provide cooperative synchronization and phasing means which do not interfere with asynchronous operation by means of the normal hand throttles when such operation is desired such as, for example, the feathering of one or more engines in an aircraft, or in maneuvering a twin-screw boat.

It is a still further object of my invention to provide phasing means which are adjustable to secure any desired phase angle between a plurality of drive shafts.

Other objects, features, and advantages of my invention will be apparent to a person skilled in the art from a reading of the hereinafter appended specification, taken in conjunction with the accompanying drawings.

In general, my invention contemplates the provision of a differential element having its pair of input shafts rigidly connected rotationally to the shafts of two drivers. The differential output operates through an integrating device to adjust the setting of the member controlling the speed of one of the drivers, which member, for example, may be a throttle. The differential output will operate to control one of the engines to the point where substantially synchronous operation is obtained.

In order that there may be no misunderstanding as to the meaning of the word, "integrating," as used in this specification, it is explained that the amount of speed correction applied by the above-described differential-integrator arrangement should not be in accordance with the relative angular velocities of the two drivers, but should be in accordance with the total difference in revolutions of the two drivers, integrated over a fairly large number of complete operating cycles of the two drivers. This result is secured by the arrangement as shown and described in this specification and drawings. It is clear, also, that the same result may be secured by employing a step-down gear ratio between the drivers and the differential and employing the output of the differential directly to provide the required speed correction.

Additionally, there is provided a phasing apparatus which normally is ineffectual until the engines are running in substantial synchronism. When such a state is obtained, the phasing device, whose control is small compared to that of the synchronizing device, becomes effective to produce relatively small changes in the speed of one of the engines, and this change takes place over a small portion of one revolution of the controlled engine.

A manual control is provided which allows the operator to select the operating phase between the two engines which results in the minimum vibration and the device then will maintain the selected phase relationship.

Both the differential element which brings the engines to synchronous operation and the phase control device exert a control which modifies the setting of at least one of the hand throttles. Thus, the engines may be operated independently of the synchronizing and phasing units by means of their normal throttle controls. Means are provided for limiting the control action of the synchronizing differential element and thus the drives may be run at different speeds outside of the control range of the synchronizing control.

My invention will be understood best by reference to the drawings in which:

Fig. 1 shows a diagrammatic representation of a preferred embodiment of my invention, as applied to the phasing of two engines, and Fig. 2 shows modifications to the throttle control arrangement of Fig. 1 to permit phasing of any number of engines by referring each controlled engine to another engine as a comparison standard.

Figure 3:
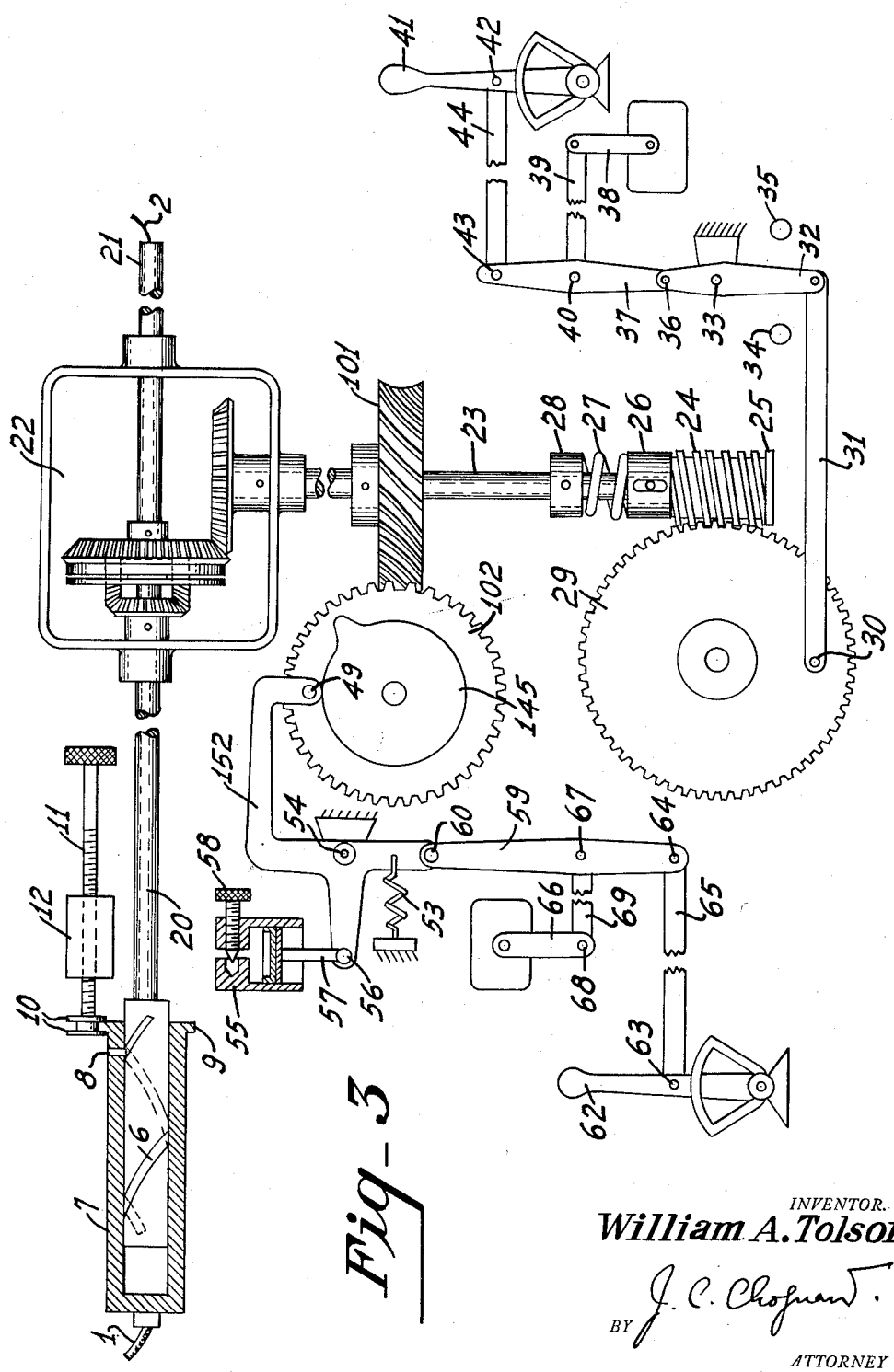
Fig. 3 shows an arrangement in which the essential operation is the same as that shown in Fig. 1, except that a reduction in the number of operating parts is effected.

Referring to Fig. 1, flexible shafts 1 and 2 are driven in a one-to-one ratio from the crankshafts to the respective engines to be phased (only the throttle-control crank arms of the respective engines being shown). The direction of rotation of flexible shafts 1 and 2 is such that they drive gears 3 and 4 in the same direction. Either shaft #1 or shaft #2 (in this case shaft #1) is connected with its driven gear through a device for adjustably changing the angular relationship between shaft 1 and its driven gear 3. Shaft 5, carrying gear 3 also carries a spiral groove 6 making two complete turns about its periphery. (For clearness in the drawing, the groove has been shown as making only one revolution of the shaft.) Flexible shaft 1 drives a sleeve 7 slidably disposed with respect to shaft 5. Sleeve 7 carries a pin 8 which engages spiral groove 6 in shaft 5. Sleeve 7 also carries a flange 9 which rides between the two flanges 10 carried by screw 11. Screw 11 is supported by threaded nut 12, which is rigidly attached to the frame of the unit. It may thus be seen that rotation of screw 11 serves to move sleeve 7 axially along shaft 5 and, by virtue of pin 8 riding in groove 6, serves to adjustably determine the angular relationship between shaft 1 and its driven gear 3. The reason for providing an adjustable angular relationship between shaft 1 and its driven gear 3 will be made clear hereinafter in this specification.

Gears 3 and 4 drive shafts 13 and 14 through gears 15 and 16 respectively. Gears 3 and 15 have the same ratio of diameters as gears 4 and 16, although gears 15 and 16 have different diameters for reasons which will become apparent. Gear 15 drives gear 17 through idler gear 18, and gear 16 drives gear 19 directly. The tooth ratio of gears 16 and 19 is the same as that of gears 15 and 17 although both gears 15 and 17 have been made smaller than gears 16 and 19 respectively, in order to accommodate the idler gear 18, which serves the purpose of causing shafts 20 and 21 to rotate in opposite directions. This condition is a prerequisite to the proper functioning of differential 22, which may be of any of the well known spur-gear, bevel-gear, or ball types wherein the output shaft remains stationary for equal and opposite rotation of the two input shafts. Other types or arrangements of differentials may be employed, provided that suitable gear ratios and directions of rotations are provided so as to satisfy the condition that the output shaft remains stationary for equal angular velocities of the two engines. The differential output shaft 23 has, as is well known, an angular velocity which is proportional to the difference between the angular velocities of shafts 20 and 21. When 24 is frictionally driven by shaft 23 by virtue of being clamped between the fixed collar 25 and the slidably-arranged collar 26, pressure being applied by spring 27 resting against fixed collar 28.

Worm 24 drives worm gear 29 which carries crank pin 30 driving the connecting link 31. Link 31 drives a lever 32 turning about a fixed pivot 33. The upper end of lever 32 carries a plurality of pivot pin holes 36, any one of which may be used as the pivot for the lower end of lever 37. Lever 37 controls the position of throttle-control crank arm 38 through connecting link 39 and pin 40. The position of the upper end of lever 37 is determined by the position of the hand throttle lever 41 by virtue of pivot pins 42, 43, and connecting link 44. The limits of motion of lever 32 are determined by the positions of stops 34 and 35, which are adjustable to allow for more or less movement of lever 32. An examination of this linkage system shows that movements of lever 32 serve to modify the position of throttle-control crank arm 38 from the position as set by hand throttle lever 41. The need for a plurality of operating points for pivot pin 36 and for an adjustable distance between stops 34 and 35 may be explained as follows:

In a servo system, the rate at which corrections may be applied is determined by the total rotational inertia of the driving system, and by the rapidity with which the driver or drivers will respond to changes in the speed-control elements. An attempt to apply corrections at too fast a rate will result in hunting and will defeat the purpose of the system. However, since it is desirable to have the system corrected at the fastest rate consistent with reliable operation, and since the control characteristics of driving systems are subject to considerable variations, it is desirable to be able to modify the amount of correction to be applied, or the rate at which the correction is applied, or both.

In the light of the above explanation, it will be seen that the total angular swing of lever 32 permitted by stops 34 and 35 determines the total number of revolutions of shaft 23 required to produce the maximum amount of correction, or modification of throttle-control crank arm 38. An increase in the allowable motion of lever 32 also results in an increase in the total amount of movement of arm 38. This effect may be compensated for by suitably positioning pivot pin 36 in one of its plurality of pivot pin holes in lever 32.

Having described the mechanical arrangement of that portion of the equipment designed to effect synchronization, the mechanical arrangement of that portion of the equipment designed to operate cooperatively to produce phasing will now be described.

Shaft 13 carries, in addition to gear 15, a two-lobe cam 45. A two-lobe cam is shown on the assumption that the engines to be phased are of the 4-cycle type. Since a compelte engine operating cycle corresponds to two engine revolutions, or one-half revolution of cam 45, both lobes correspond to the same relative position in the cycle of events of the engine. Shaft 14 carries in addition to gear 16, a rigidly attached member which in turn carries a lever 47 which is mounted in such a manner that it is held substantially parallel to the axis of the shaft in one plane, but is free to rotate about pivot pin 48 in the other plane. Lever 47 extends along the common axis of shafts 13 and 14, to a point where roller 49, mounted on its end, rolls around the periphery of a two-lobe cam 45. A projection on lever 47 extends inward radially to a point where the ball-shaped end of this projection 50 lies approximately on the common axis of rotation of shafts 13 and 14.

Shaft 13 is hollow, and carries a smaller shaft 51 which is free to move axially with respect to shaft 13. It will be seen that, if shaft 14 has a different angular velocity from that of shaft 13 due to a slow drift in phase of the two engines, roller 49 will travel around the periphery of cam 45 and will ride up and down over the lobes of the cam, thereby transmitting to shaft 51 an axial motion, which results in a corresponding movement motion of lever 52. Lever 52 rotates about the fixed pivot 54 and is held firmly against the end of shaft 51 by the action of spring 53. This action also serves to maintain roller 49 in contact with the periphery of cam 45 so long as the relative motion of roller 49 with respect to cam 45 is very slow. Lever 52 also drives the plunger of a dash-pot type of uni-directional impedance 55 through pin 56 and connecting link 57. The shape of the plunger washer in dash pot 55 is such as to allow the plunger to move downward freely, while the speed with which the plunger is allowed to move upward is determined by the pressure exerted by spring 53 and the setting of leakage-adjustment needle valve 58. The necessity for such an arrangement is made evident by a consideration of the condition prevailing if, for instance, shaft 13 were stationary due to engine #1 being shut down. Under this condition the rotational rate of shaft 14 with respect to shaft 13 would be the full absolute rotational rate of shaft 14, and the roller 49, with its associated linkage, would be forced to follow the contour of cam 45 at a very high rate, resulting in rapid wear on all the parts subjected to the high rate of oscillatory motion, without accomplishing any useful purpose. Under the above condition, the dash pot would allow the roller 49 to rise to the tip of the cam lobe but would not allow it to follow down the other slope of the lobe due to the slow leakage of pressure from the dash pot. The overall effect of this operation would be to maintain roller 49 in a position very close to that corresponding to the tips of the cam lobes, and the total motion imparted to the linkage system would be only that necessary to replenish the air lost by the dash pot during the time of one-half revolution of the cam. The manner in which this operation fits into the over-all operation of the equipment will be described in detail later.

Lever 52 serves to provide a pivot point about which lever 59 rotates by means of pivot pin 60 which may be fitted into any one of a plurality of holes 61 which pass through both levers 52 and 59.

The position of the lower end of lever 59 is determined by the position of the hand throttle-control lever 62 by means of pins 63, 64 and link 65. The position of throttle-control crank arm 66 is determined by the position of lever 59 by means of pins 67, 68 and link 69. It is thus seen that the position of throttle-control crank arm 66 may be adjusted by the hand throttle-control 62, but this adjustment may be modified by motion of lever 52. The amount of such modification is dependent upon in which of the holes 61 pin 60 is placed.

Fig. 2 shows the necessary changes in Fig. 1 to enable both the synchronizing and phasing controls to operate upon the throttle of the same engine. Under this condition, any engine may be phased with respect to any other engine used as a reference standard. When three or more engines are employed, one engine may be used as a reference standard for all the other engines, or each engine may be used as a reference standard for each succeeding engine, if desired, without interfering with asynchronous operation of any or all engines by means of the normal manual throttle controls. In Fig. 2 like numerals with Fig. 1 indicate identical parts. It will thus be seen that the entire arrangement of levers 32 and 37, with their respective driving links, is unchanged except that pivot point 33 of lever 32 has been removed from its rigid mounting and has been transferred to link 70 driven from lever 71 by means of pin 72. Link 70 is guided by pins 73 to prevent motion of levers 32 and 37 in a vertical direction. Lever 71 rotates about pivot pin 74 which is rigidly affixed to the frame. Lever 71 is driven by lever 52 of Fig. 1 by means of pin 60 and link 76 of Fig. 2. Under this operating condition, lever 59 and link 69 of Fig. 1 are removed, and hand throttle control lever 62 is connected to control the throttle-control crank arm 66 directly, and independently of both the synchronizing and phasing means.

Having described the mechanical relationships existing between the various parts, the operation of the device as a whole will be described. Assuming the operation of only two engines, as shown in Fig. 1, the operator would set the respective hand throttles to give the desired speed, and in such relationship that the two engines are rotating at approximately the same speed. Under this condition, let us assume that the engine driving flexible shaft 2 (which is the engine whose throttle crank arm has been shown as 38), is rotating at a slightly slower rate than the other engines (which is driving flexible shaft 1, and whose throttle control crank arm has been shown as 66). Differential input shaft 21 is thus rotating at a slightly slower rate than input shaft 20. This condition produces a slow rotation of differential output shaft 23, and worm gear 29 begins to rotate lever 32 about its pivot 33 by means of crank pin 30 and link 31, thus slowly modifying the setting of throttle-control crank arm 38 in such a direction as to increase the speed of the engine. During this operation shafts 13 and 14 have been operating at slightly different speeds, under which condition cam roller 49 would tend to follow the contour of cam 45 but would be prevented from so doing by the action of dash pot 55 as explained previously. When shaft 23 has rotated a sufficient number of revolutions to produce the required amount of modification in the setting of throttle-control crank arm 38, synchronous operation will be achieved. Under this condition the two engines would normally "hunt" with respect to each other, and their respective phase angle would shift back and forth by an amount and with a velocity dependent upon the dynamic characteristics of the entire system. However, before this condition has been reached, the phasing mechanism hereinbefore described comes into operation in the following manner.

When the speed of shaft 14 approaches that of shaft 13 sufficiently closely so that dash pot 55 will allow roller 49 to follow the contour of cam 45, lever 47 will operate to modify the setting of throttle crank arm 66 to reduce the speed of this engine. This action will take place each time roller 49 is forced upward by one of the projections on cam 45. If roller 49 passes over the projection, throttle-control crank arm 66 will be returned to its previous position. Let us assume that the first time roller 49 is forced outward, the resultant modification in the setting of lever 66 is not sufficient to stop the motion between shafts 13 and 14. Roller 49 will thus ride over the cam lift and return lever 66 to its former position. Shaft 13 will then rotate with respect to shaft 14 for at least a half revolution, when roller 49 will again start modifying the setting of lever 66. However, this half revolution has resulted in a further slight modification in the throttle control of the other engine by virtue of the integrating action of the worm gear 29.

On the next excursion of roller 49 there will therefore be a slightly greater tendency for the modification of the setting of lever 66 to be able to stop the angular rotation of shaft 13 with respect to shaft 14. This action is continued until the integrated modification of lever 38 is sufficient for the modification of lever 66 to stop the relative rotation of shafts 13 and 14 with such an angular relationship that roller 49 is resting on the slope of one of the two cam lifts. This angular relationship will be maintained due to the fact that any shift in the angular relationship between shafts 13 and 14 with respect to each other will result in a modification of the setting of throttle-control 66 in such a direction as to oppose that motion.

Having achieved a stable condition of phase, we may now find that the vibrational effects of the two engines are additive with respect to the structural members of the craft. Such a condition may be corrected by an adjustment of screw 11 which, as previously explained, changes the angular relationship between shaft 1 and its driven gear 3. Thus by means of this adjustment the phase angle (between the engines), at which stable operation occurs may be adjusted to an optimum value. It is apparent that, once this adjustment is made for a particular installation, it should not need to be changed thereafter.

In connection with the integrating action of gear 29, it is apparent that the position of stops 34 and 35 determine the limits through which the total revolutions of shaft 23 may be integrated. In practical operation it may occur that the limit of integration may be reached before phasing is secured. Under this condition, lever 32 will rest against stop 34 or 35 and gear 29 will be blocked. Shaft 23 will continue to rotate, however, being allowed to do so by slippage of the friction drive for worm 24. It is therefore advantageous to provide, at the operator's position, a visual indication such as indicator lamps to inform the operator as to what throttle adjustment should be made to secure the required operating condition.

As explained before, the modifications shown in Fig. 2 must be used when three or more engines are to be phased. This same arrangement may also be used alternatively with Fig. 1 for two-engine installations. It will be observed that the only difference in operation between the arrangements shown by the two figures is that Fig. 1 indicates synchronization being accomplished by a modification of the throttle setting of one engine, while phasing is accomplished by modifying the throttle setting of the other engine, whereas Fig. 2 indicates both synchronization and phasing being accomplished by modifying the throttle setting of the same engine.

Fig. 3 shows an embodiment of my invention which provides identical operating functions with the arrangement shown in Fig. 1. However, a simplification of mechanical arrangement has been effected which provides for greater ease of construction. Due to the elimination of some gears and shafting, the description of operation as given for Fig. 1 cannot be used verbatim, so the operation of Fig. 3 will be given in full below although it will be observed that the functional operation is identical with that described above for Fig. 1. Like numerals in all drawings indicate identical parts.

The mechanical differences between Fig. 3 and Fig. 1 will now be enumerated. In Fig. 3 cam 145 replaces cam 45 in Fig. 1 and is driven from shaft 23 instead of shaft 13. Since shaft 23 now rotates at one-half the difference between the speeds of the two drivers, cam 145 carries only one lobe instead of two as shown for cam 45. It should be noted that cam 145 is shown as being driven from shaft 23 through the two spiral gears 101 and 102. This is done solely for the purpose of bringing the plane of cam 145 into the plane of the drawing to show the shape of the cam. Operationally, cam 145 may be mounted directly on shaft 23. The shape of lever 52 in Fig. 1 has been changed to carry follower roller 49 riding on cam 145 in Fig. 3. Gears 3, 4, 15, 16, 17, 18 and 19 have been eliminated, as well as shafts 13 and 14 with their associated parts 47, 48, 50 and 51. Flexible shaft 1 drives shaft 20 through the phase-adjusting device consisting of parts 6, 7, 8, 9, 10, 11 and 12. Flexible shaft 2 drives shaft 21 directly. Flexible shafts 1 and 2 are driven directly from drivers 1 and 2, respectively. Differential 22 is shown in cross-section to clarify the mode of operation. It should be noted that output shaft 23 rotates at one half the difference between the speeds of shafts 20 and 21. The multiplicity of pivot pin holes in the various linkages has been omitted in the interest of clearness. The operation of Fig. 3 is as follows.

Referring to Fig. 3 flexible shafts 1 and 2 are driven in a one-to-one ratio from the crankshafts of the respective engines to be phased (only the throttle-control crank arms of the respective engines being shown). The direction of rotation of flexible shafts 1 and 2 is such that they drive shafts 20 and 21 in opposite directions. Shaft 1 is connected with its driven shaft 20 through a device for adjustably changing their angular relationship as described in Fig. 1. Shaft 23 serves to modify the setting of throttle-control crank arm 38 exactly as described for Fig. 1.

Having described the mechanical operation of that portion of the equipment designed to effect synchronization, the operation of the phasing portion of the equipment will now be described.

Cam-follower roller 49 rides on cam 145, thereby transmitting to lever 152 a motion about its pivot point 54. Roller 49 is normally held against cam 145 by action of spring 53, so long as the relative motion of roller 49 with respect to cam 145 is very slow. Lever 152 also drives the plunger of a dash-pot type of uni-directional impedance 55 through pin 56 and connecting link 57. The shape of the plunger washer in dash pot 55 is such as to allow the plunger to move downward freely, while the speed with which the plunger is allowed to move upward is determined by the pressure exerted by spring 53 and the setting of leakage-adjustment needle valve 58. The necessity for such an arrangement is made evident by a consideration of the condition prevailing if, for instance, shaft 13 were stationary due to engine 1 being shut down. Under this condition the rotational rate of shaft 14 with respect to shaft 13 would be the full absolute rotational rate of shaft 14, and the roller 49, with its associated linkages, would be forced to follow the contour of cam 145 at a very high rate, resulting in rapid wear on all the parts subjected to the high rate of oscillatory motion, without accomplishing any useful purpose. Under the above condition the dash pot would allow the roller 49 to rise to the tip of the cam lobe but would not allow it to follow down the other slope of the lobe, due to the slow leakage of pressure from the dash pot. The overall effect of this operation would be to maintain roller 49 in a position very close to that corresponding to the tip of the cam lobe, and the total motion imparted to the linkage system would be only that necessary to replenish the air lost by the dash pot during the time of one revolution of the cam.

Lever 152 serves to provide a pivot point about which lever 59 rotates by means of pivot pin 60.

The position of the lower end of lever 59 is determined by the position of the hand throttle-control lever 62 by means of pins 63, 64, and link 65. The position of throttle-control crank arm 66 is determined by the position of lever 59 by means of pins 67, 68, and link 69. It is thus seen that the position of throttle-control crank arm 66 may be adjusted by the hand throttle-control 62, but this adjustment may be modified by motion of lever 152.

Fig. 2 shows the necessary changes in Fig. 3 to enable both the synchronizing and phasing controls to operate upon the throttle of the same engine. Under this condition any engine may be phased with respect to any other engine used as a reference standard. When three or more engines are employed, one engine may be used as a reference standard for all the other engines, or each engine may be used as a reference standard for each succeeding engine, if desired, without interfering with asynchronous operation of any or all engines by means of the normal manual throttle controls. In Fig. 2 like numerals with Fig. 3 indicate identical parts. It will thus be seen that the entire arrangement of levers 32 and 37, with their respective driving links, is unchanged except that pivot point 33 of lever 32 has been removed from its rigid mounting and has been transferred to link 70 driven from lever 71 by means of pin 72. Link 70 is guided by pins 73 to prevent motion of levers 32 and 37 in a vertical direction. Lever 71 rotates about pivot pin 74 which is rigidly affixed to the frame. Lever 71 is driven by lever 152 of Fig. 3 by means of pin 60 and link 76 of Fig. 2. Under this operating condition, lever 59 and link 69 of Fig. 3 are removed, and hand throttle control lever 62 is connected to control the throttle-control crank arm 66 directly, and independently of both the synchronizing and phasing means.

Having described the mechanical relationships existing between the various parts, the operation of the device as a whole will be described. Assuming the operation of only two engines, the operator would set the respective hand throttles to give the desired speed, and in such relationship that the two engines are rotating at approximately the same speed. Under this condition let us assume that the engine driving flexible shaft 2 (which is the engine whose throttle crank arm has been shown as 38), is rotating at a slightly slower rate than the other engine (which is driving flexible shaft 1, and whose throttle control crank arm has been shown as 66). Differential input shaft 21 is thus rotating at a slightly slower rate than input shaft 20. This condition produces a slow rotation of differential output shaft 23, and worm gear 29 begins to rotate lever 32 about its pivot 33 by means of crank pin 30 and link 31, thus slowly modifying the setting of throttle-control crank arm 38 in such a direction as to increase the speed of the engine. During this operation cam 145 has been rotating with respect to follower roller 49 under which condition cam roller 49 would tend to follow the contour of cam 145 but would be prevented from so doing by the action of dash pot 55 as explained previously. When shaft 23 has rotated a sufficient number of revolutions to produce the required amount of modification in the setting of throttle-control crank arm 38, synchronous operation will be achieved. Under this condition the two engines would normally "hunt" with respect to each other, and their respective phase angle would shift back and forth by an amount and with a velocity dependent upon the dynamic characteristics of the entire system. However, before this condition has been reached, the phasing mechanism hereinbefore described comes into operation in the following manner.

When the speed of cam 145 becomes slow enough that dash pot 55 will allow roller 49 to follow the contour of cam 145, lever 152 will operate to modify the setting of throttle crank arm 66 to reduce the speed of this engine. This action will take place each time roller 49 is forced upward by the projection of cam 145. If roller 49 passes over the projection, throttle-control crank arm 66 will be returned to its previous position. Let us assume that the first time roller 49 is forced outward, the resultant modification in the setting of lever 66 is not sufficient to stop the motion between shafts 20 and 21. Roller 49 will thus ride over the cam lift and return lever 66 to its former position. Shaft 20 will then rotate with respect to shaft 21 for at least two revolutions when roller 49 will again start modifying the setting of lever 66. However, the revolution of shaft 23 has resulted in a further slight modification in the setting of throttle-control crank arm 38 by virtue of the integrating action of worm gear 29.

On the next excursion of roller 49 there will therefore be a slightly greater tendency for the modification of the setting of lever 66 to be able to stop the angular rotation of shaft 20 with respect to shaft 21. This action is continued until the integrated modification of lever 38 is sufficient for the modification of lever 66 to stop the relative rotation of shafts 20 and 21 with such an angular relationship that roller 49 is resting on the slope of the cam lift. This angular relationship will be maintained due to the fact that any shift in the angular relationship between shafts 20 and 21 will result in a modification of the setting of throttle-control 66 in such a direction as to oppose that motion.

Having achieved a stable condition of phase, we may now find that the vibrational effects of the two engines are additive with respect to the structural members of the craft. Such a condition may be corrected by an adjustment of screw 11 which, as previously explained, changes the angular relationship between shaft 1 and its driven shaft 20. Thus by means of this adjustment to phase angle (between the engines), at which stable operation occurs may be adjusted to an optimum value. It is apparent that, once this adjustment is made for a particular installation, it should not need to be changed thereafter.

It is apparent that the above system may be used for providing phasing between steam turbines or reciprocating engines used for ship propulsion.

It is also apparent that this system may be employed for phasing the shafts of electric motor drives where motors suitable for speed control are employed. For instance, in the case of D. C. motors, the speed controls as described above could operate instead on a field intensity control, and in the case of wound-rotor induction motors the speed controls could operate on variable resistance elements connected in series with the rotor windings.

What I claim is:

1. In a system for phasing two drivers, two rotating shafts forming equivalent parts of the said two drivers, independently operated manual speed controls for said two drivers, a differentially operating device having two input shafts and an output shaft, said two input shafts being driven from said two first-named shafts so that the angular velocity of said output shaft is proportional to the difference between the angular velocities of said two drivers, an output device driven by said output shaft and having the characteristic that its motion is dependent upon the total difference in revolutions of said two drivers integrated between definite operating limits, means connecting said output device with one of said independently operated manual speed controls to modify the setting of said speed control in accordance with the setting of said output device, a cam driven from one of the two rotating shafts, a cam follower driven from the other of said two rotating shafts in the same ratio and direction as said cam, so that equal angular velocities of said two drivers result in a condition of no relative angular motion between said cam and said cam follower, and means connecting said cam follower with either of said independently operated manual speed-control means in such a manner that the setting of said speed-control means is modified in accordance with the relative position of said cam with respect to said cam follower, said cam being so designed as to provide effective control of the position of said cam follower over only a relatively small part of the total operating cycle of said two drivers.

2. In a system for phasing two drivers, independently-operated manual speed-control means for controlling the speed of the two drivers, means for modifying the setting of one of said speed-control means in accordance with the total difference in revolutions between said two drivers integrated over a predetermined range of operation extending over several complete cycles of operation of said two drivers to effect approximate synchronization and means for modifying the setting of one of said manual speed-control means in accordance with the relative instantaneous angular position of the two said drivers to effect and maintain a predetermined angular relationship between said two drivers.

3. In a system for phasing two drivers, independently-operated manual speed-control means, means comprising a differential and an integrator for effecting modification of the relative speed-control settings to produce approximate synchronization, and means comprising a cam driven by one of said drivers, and a cam follower driven by the other of said drivers, for effecting modification of the relative speed-control settings to produce phasing.

4. Apparatus as described in claim 3 wherein said differential and integrator means operate cooperatively with said cam and cam follower to produce, over a series of operating cycles of said drivers, an optimum condition for the establishment of phasing.

5. In a system for phasing two drivers, independently-operated manual speed-control means for said drivers, differential and integrating means driven by said drivers and coupled to at least one of said speed control means, for effecting modification of the relative speed-control settings to produce substantial synchronization of the two drivers, means comprising a cam driven by one of said drivers, and a cam follower driven by the other of said drivers for effecting modification of the relative speed-control settings to produce phasing, and means for varying the relative angular relationship between the cam and cam follower so that said phasing occurs at a predetermined angular relationship between the two drivers.

6. Apparatus as described in claim 5 wherein the total modification in relative speed-control setting due to the action of said cam and cam follower is greater than the modification in relative speed-control setting provided by said differential and integrating means due to a shift in angular relationship between said two drivers equivalent to one complete cycle of operation of said drivers.

7. Apparatus in accordance with claim 2 wherein the means for measuring the difference in speed of rotation of the shaft members comprises a differential member rigidly coupled rotationally to the driven members.

8. Apparatus in accordance with claim 5, wherein the control exerted by the synchronizing means on the member for controlling the speed of rotation of one of the shaft members during the interval in which there is a difference of one revolution between the rotations of the shafts is less than the total control exerted by the phasing member on the member controlling the speed of rotation of one of said shaft members.

9. Apparatus for phasing two driven shaft members comprising a cam driven by one of said shaft members, a cam follower driven by the other of said shaft members, the relative position of said cam and cam follower being representative of the phase relationship between said shaft members, means for coupling the cam follower to a speed-control member for controlling the speed of one of the shaft members and means for limiting the operation of said speed control member to the intervals during which the shafts are in substantial synchronism and relatively slowly drift through a predetermined phase relationship.

10. Apparatus in accordance with claim 9, wherein the means coupled to the cam follower for influencing the speed-control member comprises a lever arm, and the means for limiting its influence on the speed-control means to the intervals during which the shafts are in substantial synchronism and relatively slowly drift through a predetermined phase relationship comprises a device coupled to said lever arm for determining the speed at which said lever arm may move in one direction of its motion about its pivot.

11. Apparatus for synchronizing and phasing two driven shafts comprising a differential member, means coupling said shafts to the inputs of said differential member, gear means coupled to the output of the differential member, means for coupling said gear means to the speed-control means for one of said shafts, a cam driven by one of said shafts, a cam follower positioned adjacent the face of said cam and driven by the other of said shafts, lever means coupled to the speed control of one of said shafts for influencing said speed control, means coupling said lever means to said cam follower, and means for limiting the effect of said lever means on said speed control to the interval during which the shafts are in substantial synchronism and drift slowly through a predetermined phase relationship.

12. In a system for phasing two drivers, independently-operated manual speed-control means for each driver, a differential and integrating device for modifying the setting of one of said speed-control means to effect approximate synchronization, and a cam-follower device for modifying the setting of one of said speed-control devices to effect and maintain a predetermined phase relationship between said two drivers, and a time-delay device for preventing effective action of said cam-and-follower device except under the condition where the two drivers are in approximate synchronization.

13. Apparatus in accordance with claim 12 and including a device for changing the angular relationship between the two said drivers at which stable operation of said phasing device occurs.

14. In a system for phasing two drivers, independently-operated manual speed controls for said two drivers, a differential device having two input shafts and an output shaft, said two input shafts being driven respectively from said two drivers so that the angular velocity of said output shaft is proportional to the difference between the angular velocities of said two drivers, an output device driven from said output shaft and characterized by the fact that the motion of said output device is dependent upon the total difference in revolutions of said drivers integrated between operating limits extending over several complete cycles of operation of said two drivers, means connecting said output device with one of said independently-operated manual speed controls to modify the setting of said speed control in accordance with the setting of said output device, a cam driven from said output shaft, a cam follower driven by said cam, a connecting link between said cam follower and one of said speed controls whereby the setting of said speed control is modified in accordance with the angular position of said cam with respect to said cam follower.

15. Apparatus in accordance with claim 14 characterized by the fact that the shape of said cam is such that it is effective to drive said cam follower over only a relatively few degrees of rotation of said cam.

16. Apparatus in accordance with claim 14 including a device for changing the relative angular position of the two drivers at which the phasing action occurs.

WILLIAM A. TOLSON.

References Cited in the file of this patent

UNITED STATES PATENTS

| Number | Name | Date |
|---|---|---|
| 502,557 | Doolittle | Aug. 1, 1893 |
| 532,861 | Bell | Jan. 22, 1895 |
| 1,222,547 | Jackson | Apr. 10, 1917 |
| 1,465,091 | Prince | Aug. 14, 1923 |
| 2,003,558 | Schmidt | June 4, 1935 |
| 2,054,903 | Moore | Sept. 22, 1936 |
| 2,160,324 | Berges | May 30, 1939 |
| 2,250,695 | Algarsson | July 29, 1941 |
| 2,252,545 | Benz | Aug. 12, 1941 |
| 2,261,145 | Dickey | Nov. 4, 1941 |
| 2,269,332 | Bench et al. | Jan. 6, 1942 |
| 2,517,703 | Offner | Aug. 8, 1950 |
| 2,557,679 | Nichols | June 19, 1951 |

FOREIGN PATENTS

| Number | Country | Date |
|---|---|---|
| 452,676 | Great Britain | Aug. 27, 1936 |
| 483,303 | Great Britain | Apr. 11, 1938 |